G. W. WILLIAMS.
Centrifugal Honey-Extractor.
No. 220,454.  Patented Oct. 7, 1879.
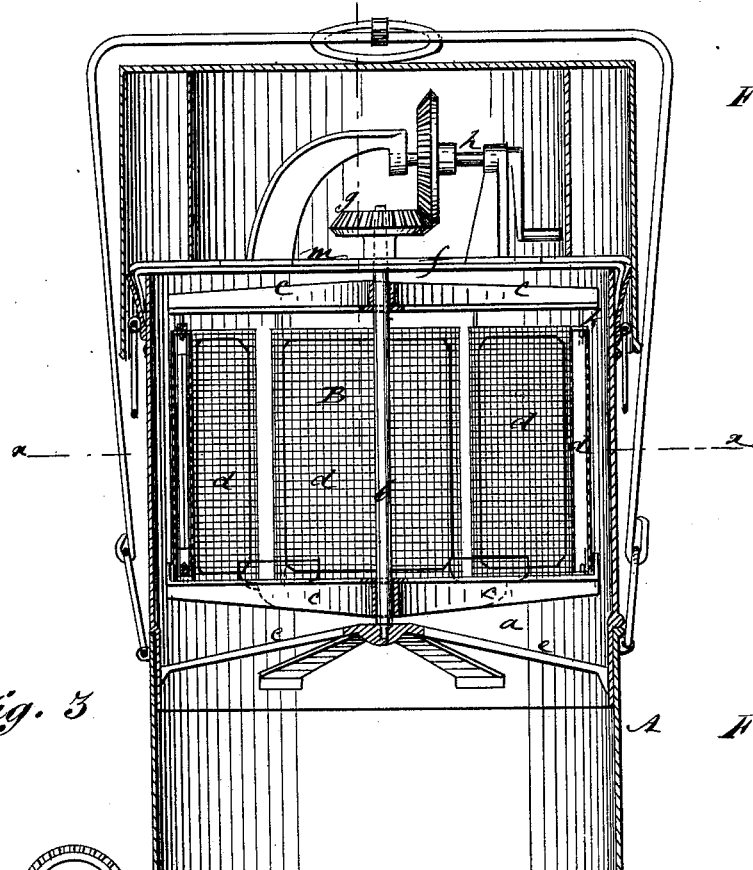
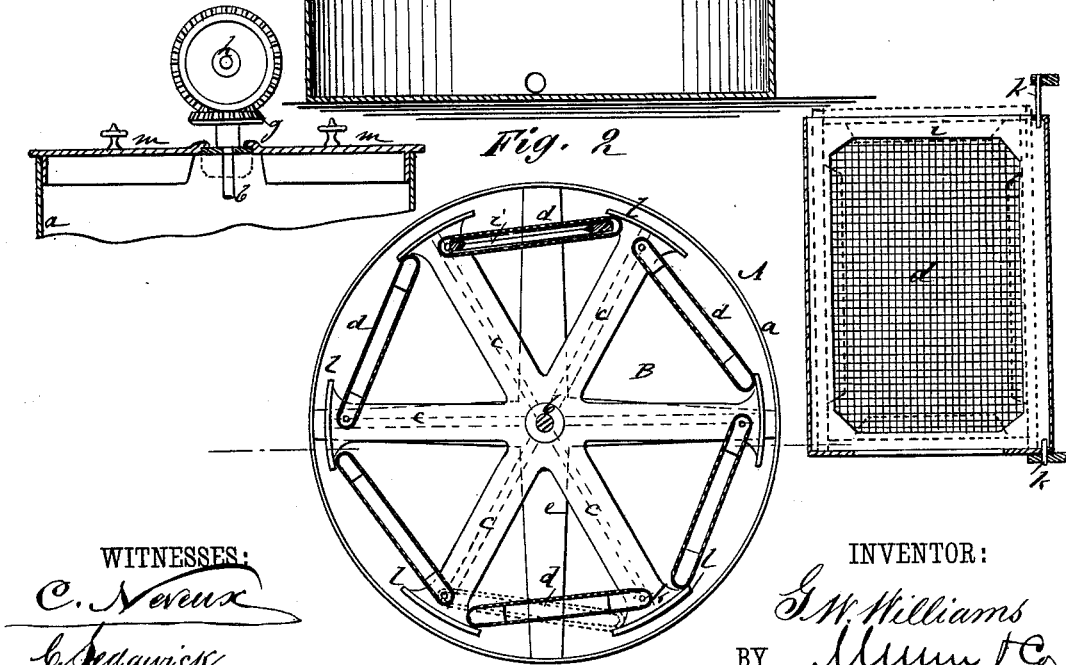
WITNESSES:
C. Neveux
C. Sedgwick
INVENTOR:
G. W. Williams
BY Munn & Co.
ATTORNEYS.

UNITED STATES PATENT OFFICE.

GEORGE W. WILLIAMS, OF SAN DIEGO, CALIFORNIA.

IMPROVEMENT IN CENTRIFUGAL HONEY-EXTRACTORS.

Specification forming part of Letters Patent No. 220,454, dated October 7, 1879; application filed May 26, 1879.

*To all whom it may concern:*

Be it known that I, GEORGE W. WILLIAMS, of San Diego, in the county of San Diego and State of California, have invented a new and Improved Centrifugal Honey-Extractor, of which the following is a specification.

The object of my invention is to furnish a simple and convenient apparatus for rapidly, effectively, and completely extracting or removing honey from the comb.

The invention consists in the combination of a revolving extractor fitted with swinging comb-holders and a cylindrical vessel; in the combination of a shaft having radial arms and hinged foraminous comb-holders; and in the combination of radial arms, having lugs at the ends, with pivoted swinging comb-holders, all as hereinafter described.

Figure 1 is a central vertical section of the complete apparatus. Fig. 2 is a section-plan view on line $x\ x$ of Fig. 1. Fig. 3 is a detail view of the gearing. Fig. 4 is a sectional elevation of one comb-holder.

Similar letters of reference indicate corresponding parts.

I make use of a cylindrical vessel, A, that is constructed with its upper portion, $a$, removable from the bottom portion. The top portion, $a$, contains and carries the revolving extractor B, from which the honey runs to the bottom part of the vessel A, and a suitable faucet is to be fitted in the lower part for drawing the honey out.

The extractor B is constructed as follows: $b$ is a central vertical shaft, fitted with the upper and lower fixed radial arms, $c$, that carry the comb-holders $d$. The shaft $b$ is stepped in the cross-bars $e$, and is supported at its upper end in a cross-bar, $f$, that is fitted across the top of the vessel A in sockets at each side, that permit its ready removal. Upon the upper projecting end of shaft $b$ is fixed a bevel gear-wheel, $g$, which meshes with a similar gear on a horizontal shaft, $h$, that is provided with a crank-handle for operating the extractor B.

The comb-holders $d$ are made of wire-netting or perforated metal bent to a flat tubular form, of a size adapted to receive between the foraminous sides the comb-frames and comb, as shown in Figs. 2 and 4 at $i$. These comb-frames are inserted from the upper end of the holders $d$, and rest at the bottom on lugs or projections on the holders. Each holder $d$ is provided with hinge-pins or trunnions $k$ at one side, by which it is hung to an upper and lower arm, $c$, so as to swing horizontally at either side of the arms, and each holder is wide enough to extend to the stop $l$ of the adjacent arm, by which stops the holders are prevented from coming in contact with the side of vessel A.

In operation the honey is thrown from the combs contained in the holders by centrifugal action, and runs to the bottom of the vessel. By turning the holders $d$ either side of the comb can be presented outward, and the direction of revolution will be made to correspond. The top of vessel A is closed by covers $m\ m$, which keep out dust and dirt.

By the above-described construction I obtain a simple and efficient apparatus that may be conveniently used with but little handling of the comb. All parts of the apparatus are removable for cleaning, and it may be made of any desired size.

I am aware that it is not new to suspend an extractor by its shaft from a top frame, or to provide comb-holders with inclined wire-cloth sides, or to arrange two or more vessels in a centrifugal machine around a common center and provided with wire screens.

Having thus described my invention, I claim as new and desire to secure by Letters Patent—

1. The revolving extractor B, fitted with swinging reversible comb-holders $d$, in combination with the vessel A, substantially as described and shown.

2. In honey-extractors, the shaft $b$, provided with radial arms $c$ and the hinged foraminous comb-holders $d$, constructed and combined for operation substantially as described and shown.

3. The radial arms $c$, having lugs at the ends, in combination with the pivoted swinging comb-holders, as and for the purpose specified.

GEORGE WARREN WILLIAMS.

Witnesses:
WM. L. WILLIAMS,
AMOS SHELLENBERGER.